(12) United States Patent
Woodward et al.

(10) Patent No.: US 7,085,845 B2
(45) Date of Patent: Aug. 1, 2006

(54) METHOD, APPARATUS AND COMPUTER PROGRAM PRODUCT FOR IDENTIFYING A PLAYING MEDIA FILE AND TRACKING ASSOCIATED USER PREFERENCES

(75) Inventors: Mark L. Woodward, Milton, MA (US); E. Oliver Jones, Andover, MA (US); Gene S. Fein, Lenox, MA (US); Christopher Harris, Amherst, MA (US); Steve S. Sherman, Boston, MA (US); Bennie Jones, Methuen, MA (US); Anthony Salotto, Norton, MA (US)

(73) Assignee: Gene Fein, Lenox, MA (US)

( * ) Notice: Subject to any disclaimer, the term of this patent is extended or adjusted under 35 U.S.C. 154(b) by 627 days.

(21) Appl. No.: 10/142,731

(22) Filed: May 8, 2002
(Under 37 CFR 1.47)

(65) Prior Publication Data
US 2003/0036948 A1    Feb. 20, 2003

Related U.S. Application Data

(60) Provisional application No. 60/289,768, filed on May 9, 2001, provisional application No. 60/289,772, filed on May 9, 2001.

(51) Int. Cl.
*G06F 15/16* (2006.01)
*H04N 7/173* (2006.01)

(52) U.S. Cl. .................................... 709/231; 725/87
(58) Field of Classification Search ............ 709/203, 709/219, 223, 231; 705/10, 27; 725/87–100
See application file for complete search history.

(56) References Cited

U.S. PATENT DOCUMENTS

| 5,485,518 A | 1/1996 | Hunter et al. |
| 5,572,643 A | 11/1996 | Judson |
| 5,640,193 A | 6/1997 | Wellner |
| 5,721,827 A | 2/1998 | Logan et al. |
| 5,749,081 A | 5/1998 | Whiteis |

(Continued)

FOREIGN PATENT DOCUMENTS

WO    WO 01/04777 A2    1/2001

OTHER PUBLICATIONS

"Generating Unique ids for Audio cds," printed from internet website: <http://www.hinzen.de/cdplayer/samples/sample01.html>, Jun. 27, 2001.

(Continued)

*Primary Examiner*—Saleh Najjar
*Assistant Examiner*—Asad Muhammad Nawaz
(74) *Attorney, Agent, or Firm*—Hamilton, Brook, Smith & Reynolds, P.C.

(57) ABSTRACT

Collecting user preference information related to a playing media recording is accomplished by gathering descriptive information related to the playing media recording from a media player program presenting the playing media recording and determining if tags are embedded in the media recording and gathering descriptive information related to the playing media recording from the tags embedded in the playing media recording, if the tags exist. Further, determining if a table of contents exists on the media recording and gathering a table of contents for a collection containing the playing media recording by identifying the collection using a concatenation of track lengths identifier generation technique, if the table of contents exists. Then assembling the descriptive information into a media recording information packet and sending the media recording information packet to a server computer, resulting in a collection of user preference information related to the playing media recording.

10 Claims, 3 Drawing Sheets

U.S. PATENT DOCUMENTS

| | | | |
|---|---|---|---|
| 5,761,606 A | 6/1998 | Wolzien | |
| 5,761,662 A | 6/1998 | Dasan | |
| 5,774,664 A | 6/1998 | Hidary et al. | |
| 5,778,181 A | 7/1998 | Hidary et al. | |
| 5,809,512 A | 9/1998 | Kato | |
| 5,892,825 A | 4/1999 | Mages et al. | |
| 5,913,204 A | 6/1999 | Kelly | |
| 5,915,243 A | 6/1999 | Smolen | |
| 5,931,906 A * | 8/1999 | Fidelibus et al. | 709/217 |
| 5,933,811 A | 8/1999 | Angles et al. | |
| 5,937,392 A | 8/1999 | Alberts | |
| 5,945,988 A * | 8/1999 | Williams et al. | 715/747 |
| 5,963,916 A * | 10/1999 | Kaplan | 705/26 |
| 5,987,509 A | 11/1999 | Portuesi | |
| 5,987,525 A | 11/1999 | Roberts et al. | |
| 5,991,798 A | 11/1999 | Ozaki et al. | |
| 6,047,292 A | 4/2000 | Kelly et al. | |
| 6,061,680 A | 5/2000 | Scherf et al. | |
| 6,138,155 A | 10/2000 | Davis et al. | |
| 6,195,693 B1 * | 2/2001 | Berry et al. | 709/219 |
| 6,205,432 B1 * | 3/2001 | Gabbard et al. | 705/14 |
| 6,216,129 B1 | 4/2001 | Eldering | |
| 6,256,633 B1 | 7/2001 | Dharap | |
| 6,285,985 B1 * | 9/2001 | Horstmann | 705/14 |
| 6,298,332 B1 * | 10/2001 | Montague | 705/27 |
| 6,298,348 B1 | 10/2001 | Eldering | |
| 6,321,221 B1 | 11/2001 | Bieganski | |
| 6,330,593 B1 * | 12/2001 | Roberts et al. | 709/217 |
| 6,429,879 B1 * | 8/2002 | Sturgeon et al. | 715/723 |
| 6,609,096 B1 * | 8/2003 | De Bonet et al. | 704/500 |
| 2001/0034219 A1 | 10/2001 | Hewitt et al. | |
| 2002/0143565 A1 | 10/2002 | Headings et al. | |
| 2005/0021729 A1 | 1/2005 | Yoshida | |
| 2005/0050577 A1 | 3/2005 | Westbrook et al. | |

OTHER PUBLICATIONS

"Howto: Get or Create a Unique Audio CD Volume Label," printed from internet website: <http://support.microsoft.com/support/kb/articles/Q147/6/54.asp>, Jun. 27, 2001.

Adamec, T.M., "Recognizing an Audio CD," printed from internet website: <http://www.vbonline.com/vb-mag/9612/audio/default.html>, Jun. 27, 2001.

Philips, L., "The Double Metaphone Search Algorithm," *C/C++ Users Journal*, pp. 38-43 (2000).

"cd player.ini questions and answers," printed from internet website: http://web.archive.org/web/20000818005412/www.hinzen.de./cdplayer/q-and-a.html, Aug. 2000.

"Portable Network Graphics," printed from internet website: http://web.archive.org/web/20010207200324/www.libpng.org/pub/png/, Feb. 2001.

"ID3v2," printed from internet website: http://web.archive.org/web/20010330043006/http://www.id3v2.org/ , Mar. 2001.

"Muze Music Online Data Dictionary," printed from internet website: http://web.archive.org/web/20010412164802/http://muze.com/print.html, Apr. 2001.

"A Massively Spiffy Yet Delicately Unobtrusive Compression Library," printed from internet website: http://web.archive.org/web/20010413102952/www.freesoftware.com/pub/infozip/zlib/, Apr. 2001.

"CD Table of Contents," printed from internet website: http://www.disctronics.co.uk, 2001.

* cited by examiner

METHOD, APPARATUS AND COMPUTER PROGRAM PRODUCT FOR IDENTIFYING A PLAYING MEDIA FILE AND TRACKING ASSOCIATED USER PREFERENCES

RELATED APPLICATION(S)

This application claims the benefit of U.S. Provisional Application No. 60/289,768 filed on May 9, 2001 and U.S. Provisional Application No. 60/289,772 filed on May 9, 2001. The entire teachings of the above application(s) are incorporated herein by reference.

BACKGROUND OF THE INVENTION

This invention relates generally to tracking user preferences, and more specifically to acquiring user preference data relating to media recordings.

SUMMARY OF THE INVENTION

Collecting user preference information related to a playing media recording is accomplished by gathering descriptive information related to the playing media recording from a media player program presenting the playing media recording and determining if tags are embedded in the media recording and gathering descriptive information related to the playing media recording from the tags embedded in the playing media recording, if the tags exist. Further, the invention determines if a table of contents exists on the media recording, or gathers table of contents information for a collection containing the playing media recording by identifying the collection using a technique that concatenates track lengths to generate an identifier. Next, the invention method and apparatus assembles the descriptive information into an media recording information packet and sends the media recording information packet to a server computer, resulting in a collection of user preference information related to the playing media recording.

In an embodiment of the present invention the descriptive information comprises a user identifier; at least one of: a name of the playing media recording, a name of a collection containing the playing media recording, a name of an artist performing the playing media recording; and a sequence number of the playing media recording within the collection. Additionally, tags can be MPEG Layer 3 tags.

The present invention records a subject user's audio listening history by receiving a media recording information packet from a client computer and cross-referencing the media recording information packet with a media recording description database and returning a unique serial number for the entry in the media recording description database. A user identifier is recorded together with the unique serial number into a user preference database, such that the user preference database provides the subject user's media listening history.

Cross-referencing may include identifying an exact match in the media recording description database for a non-empty element in the media recording information packet. Cross-referencing may also include identifying a match in the media recording description database using a fuzzy-logic algorithm and determining the match based upon a highest probability computed. Cross-referencing may further include identifying an associated domain-specific element in the media recording description database for a non-empty element in the media recording information packet. Cross-referencing may further include identifying a metaphone-associated element in the media recording description database for a non-empty element in the media recording information packet.

The present invention identifies users listed in the user preference database as those who listen to the same media recording, as identified by the same unique serial number, as that listened to by the subject user. Identified users can be sent a message. The identified users can be sent a message while they are listening to the same media recording. User's preferences are inferred based upon analysis of the user's audio listening history or directly solicited from the a user. Preference may include: specific media recording, collection, artist or genre. Users with similar preferences based upon analyzing the user preference database can be identified and introduced to each other.

A user community can be created by transferring information from the user preference database into an automated collaborative filtering engine to generate a list of users having similar preferences. Lists of preferred media recordings of the user community can be created. Identified users can message each other based upon being identified as having a particular user preference for the media recording.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. In support of creating an online music community service, the present invention utilizes a unique combination of technologies. The first aspect of the present invention is implemented as client program, made available to the general public free of charge for downloading from the Internet. The second aspect is a database system and server program. The downloadable program products running on behalf of many different users simultaneously, and the server software, work together to create an online experience for users which identifies fans of the same and similar music to each other creating a dynamic collection of online communities.

Figure 1:
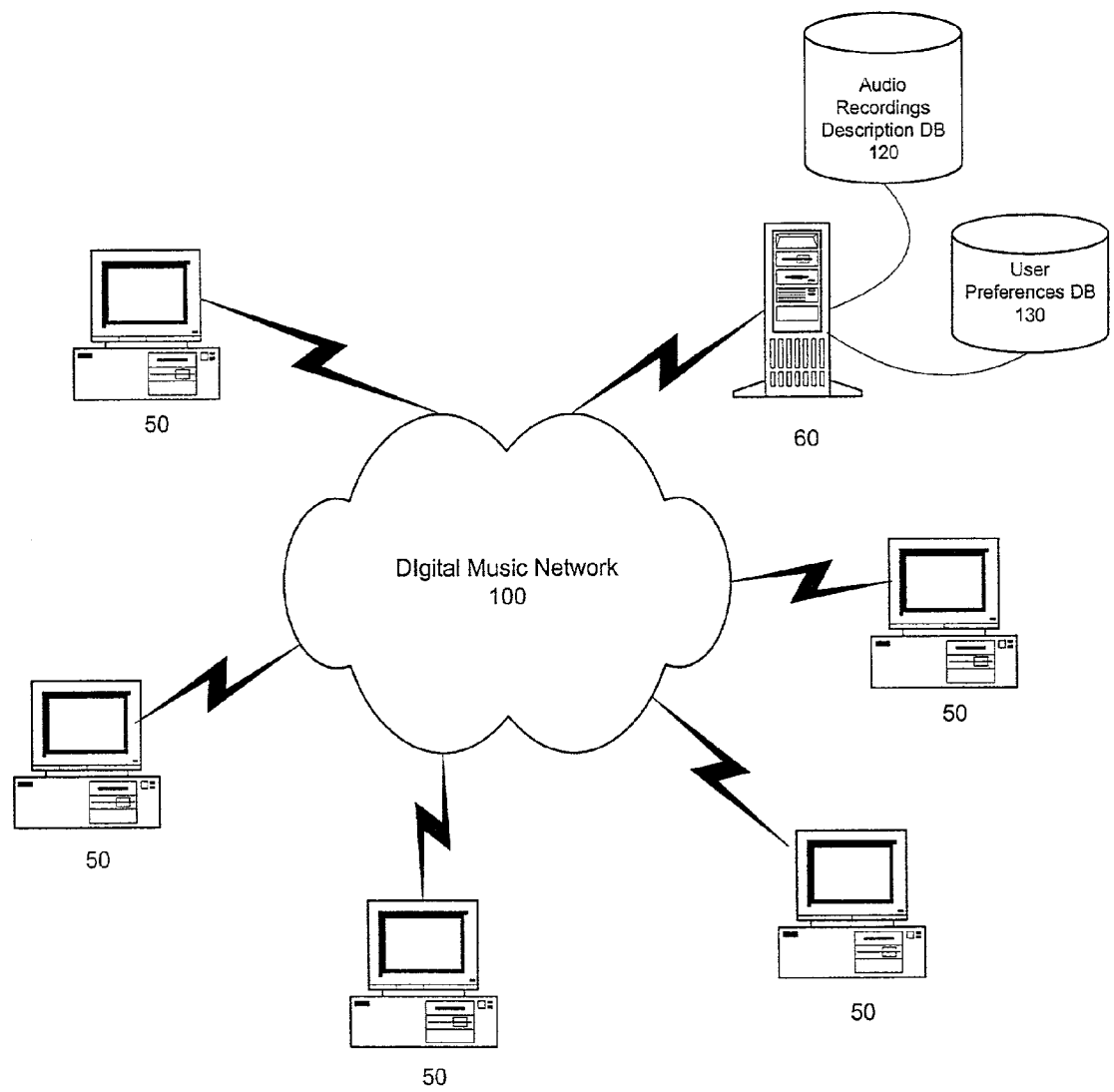
FIG. 1 illustrates a digital music network on which an embodiment of the present invention is implemented.

FIG. 1 is a diagram of a computer system on which an embodiment of the present invention is implemented. Client computer 50 provides processing, storage, and input/output devices playing recorded media. The client computers 50 can also be linked through a digital music network 100 to other computing devices, including other client computers 50 and server computers 60. The digital music network 100 can be part of the Internet, a worldwide collection of computers, networks and gateways that currently use the TCP/IP suite of protocols to communicate with one another.

The Internet provides a backbone of high-speed data communication lines between major nodes or host computers, consisting of thousands of commercial, government, educational, and other computer networks, that route data and messages. In one embodiment of the present invention, user preference information is collected and recorded in a user preferences database 130. Additionally, audio listening history is collected and recorded in an audio recordings description database 120.

Figure 2:
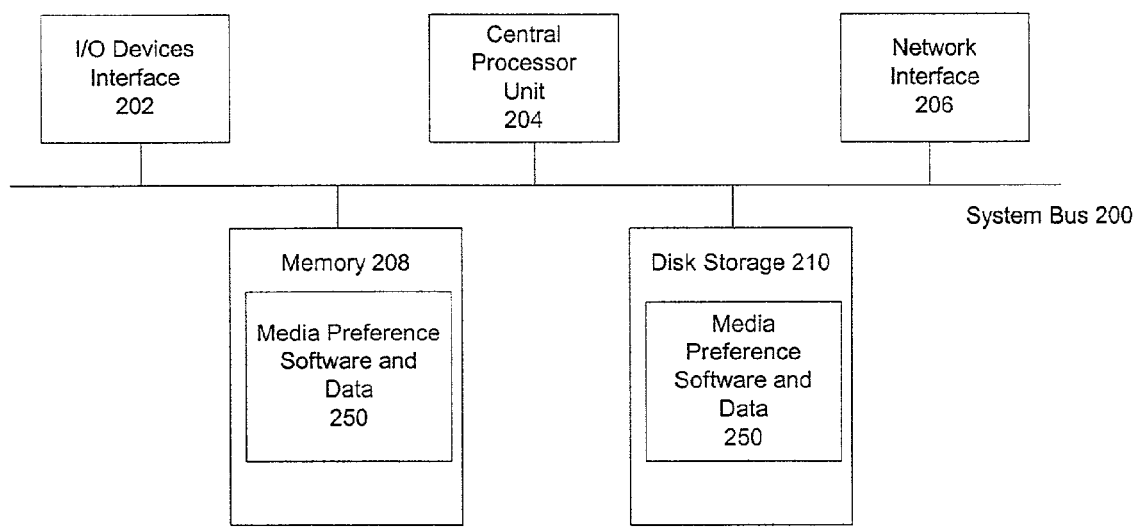
FIG. 2 is a diagram of the internal structure of a node on the digital music network of FIG. 1 configured according to an embodiment of the present invention.

FIG. 2 is a diagram of the internal structure of a computer (e.g., 50, 60) in the computer system of FIG. 1. Each computer contains a system bus 200, where a bus is a set of hardware lines used for data transfer among the components of a computer. A bus 200 is essentially a shared conduit that connects different elements of a computer system (e.g., processor, disk storage, memory, input/output ports, network ports, etc.) that enables the transfer of information between the elements. Attached to system bus 200 is an I/O device interface 202 for connecting various input and output devices (e.g., displays, printers, speakers, etc.) to the computer. A network interface 206 allows the computer to connect to various other devices attached to a network (e.g., network 70). A memory 208 provides volatile storage for computer software instructions (e.g., media preference software 250) and data structures (e.g., user preferences database 130 and audio recordings description database 120) used to implement an embodiment of the present invention. Disk storage 210 provides non-volatile storage for computer software instructions (e.g., media preference software 250) and data structures (e.g., user preferences database 130 and audio recordings description database 120) used to implement an embodiment of the present invention. A central processor unit 204 is also attached to the system bus 200 and provides for the execution of computer instructions (e.g., media preference software 250), thus allowing for the collection of user preference information and audio listening history information to provide a digital music network.

Figure 3:
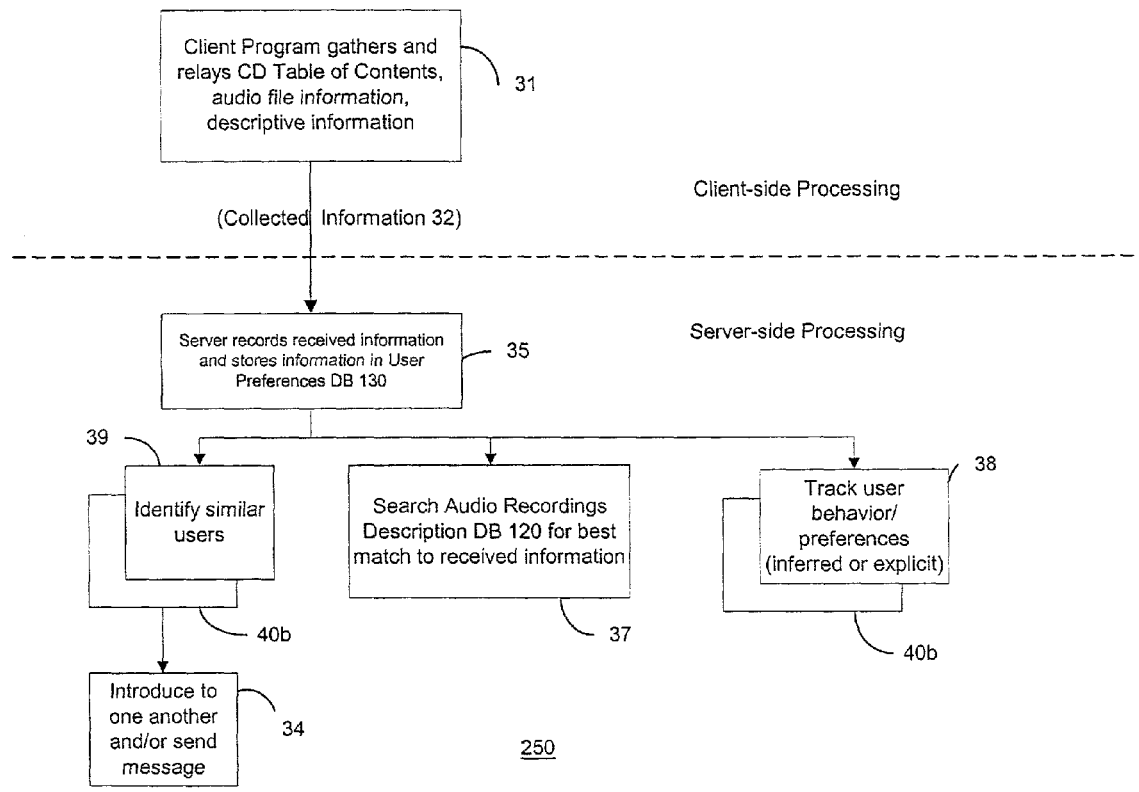
FIG. 3 is a flow diagram showing client-side processing and server-side processing in the embodiment of FIG. 1 and FIG. 2.

The present invention client program, when installed on a multimedia-capable personal computer, interacts with the server software and database system to provide the following functions as illustrated in FIG. 3.

Plug-in technology is used to sense activity. The present invention client program uses plug-in technology to sense activity in a wide variety of other program products from various sources called Media Players. These Media Player program products are used to play recorded sound —usually prerecorded music—through the PC's speakers to the user of the PC. Media Players include WINAMP, the REAL PLAYER, the MICROSOFT MEDIA PLAYER, LYCOS'S SONIQUE PLAYER, and others. Each distinct player has activity sensed by a software component compatible both with the present invention client program and the particular player. Those skilled in the art of programming for personal computers with MICROSOFT WINDOWS will appreciate that it is straightforward to develop and test such software components, known as dynamic link libraries or DLLs. Those skilled in the art will also appreciate that some media player vendors publish specifications for the development of plug-in components, and others do not. The plug-in component for each player senses when a new piece of music, sound file, or track begins to play, and relays whatever information it can determine about the music, track, or sound file being played. Specifically when players play music, they ordinarily display information about that music, such as the name of the artist, the name of the album, the name of the track or song, and the number of the track or song being played. They may also display the year the music was published, a genre (such as "funk," "classical," or "jazz"). In one embodiment the present invention client program is implemented as a plugin that gathers and relays whichever of these displayed items of data it has available (Step 31, FIG. 3).

CD Table of Contents sensing is a component of the present invention. It senses the insertion of a compact disc into the compact disc player of a personal computer. Using the retrieval techniques, it retrieves descriptive information for the CD as a whole, and for the individual tracks of the CD, from a server on the Internet. It then transmits that information (Step 31 of FIG. 3 is illustrative).

Audio file information retrieval is performed when a plugin (as described above) detects that a media player is playing an audio file, commonly a file in MPEG Layer 3 sound format (commonly known as MP3). A component 31 of the present invention client program looks for and retrieves descriptive information from within the sound file. The means for storing and retrieving such information from sound files is well known in the art. Those skilled in the art will appreciate that this sought and/or retrieved information may be present or absent, may be complete or incomplete, and may be correct, misspelled, or just plain wrong.

Assembly of information from various sources is performed within the present invention client program. A collection of (i) descriptive information about each track, coming from various sources including the player, (ii) CD contents data, (iii) type of media (compact disc, audio file, etc) and (iv) audio file tag data is assembled. Each item in the collection of information may be absent, present, or present from multiple sources. It may be complete or incomplete, and it may be wrong or right.

Collected information from the present invention client program product is relayed to the present invention server as shown at 32 in FIG. 3. The information, in the state gathered by the present invention client program as shown at 31 in FIG. 3, is transmitted to a present invention server program containing a server software package and database system. The server software makes a record of this information as shown at 35 in FIG. 3.

A lookup of a particular song is performed on the server software package using the collected information to locate the best match—the most likely song—within a database 120 structured as a sequence of records for each published compact disc or other music collection and another sequence of records for each published track (song) within the published compact discs or other music collections. The sequences of records for published compact discs are furnished by a commercial data service, and are augmented by sequences of records for other collections not made available on compact disc. The present invention server program assigns a unique serial number to each compact disc or collection, and another unique serial number to each track or song occurring within any collection. The lookup process retrieves, if possible, the unique CD serial number and the unique track serial number of the best possible matching item.

The search process 37 first looks for an exact match in each data item (performer, collection title, track title, track number, and publication year) between the data base and the information about the particular song relayed from the present invention client program. Finding a match, it yields the appropriate serial numbers. If an exact match is not found, the database system and server software performs a match using commonly known text-search techniques such as preposition removal, case-insensitive matching and number spelling. Those skilled in the art will appreciate that such techniques must be used in domain-specific ways, correctly to handle cases such as, for example, the rock-and-roll act called "The The". Finding a match in this way, the software yields appropriate serial numbers. If a match is still not found, the database system 120 and server software attempts to perform a match using sound-alike techniques as taught (e.g., metaphone and double metaphone search algorithms). As persons skilled in the art will appreciate, such techniques ordinarily yield multiple ambiguous matches, so the server software applies rules to determine the probability of correctness of each match, and chooses the most probable. If a particular match has a distinguished high probability, appropriate serial numbers are yielded. If the database server matches tracks that appear on multiple compact discs or other collections, and cannot differentiate which compact disc or other collection the track might appear on, it removes the ambiguity by choosing the compact disc or collection with the earliest date of publication. Notice that if one user of the present invention plays a sound file of "Every Breath You Take" by The Police, and another plays the same song on a compact disc, the present invention database and server software will yield the same serial number for both cases.

The present invention records current user behavior. The searched serial numbers, and the data items gathered by the present invention server software 37, are stored in a data base system 130 in a form suitable for the applications described in the following paragraphs.

The present invention server software searches, using the serial numbers, for all the users of the present invention client program at a point in time playing the same music, and using Web information display techniques, identifies 39 and introduces 34 these users to one another, so that they may interact with each other. This is possible because all the users' program products report to a centrally organized server on the Internet.

The unique matched serial number codes are used to detect behavioral actions and infer user preferences 38. If a user plays a particular track on a compact disc frequently, it is valid to infer that the user likes the music on that track. If a user plays a particular sound file frequently, it is also valid to infer that the user likes the music on that sound file. However, it is also valid to infer that the user who possesses a physical compact disc or other media has a somewhat stronger preference for the music. The present invention server software system (at 38) keeps track of repeated behavior by each user, and infers users preferences from that repeated behavior.

The present invention also solicits explicit user preferences. Using World-wide-web information systems techniques well known to those skilled in the art, such as HTML forms, the present invention client program solicits its users explicitly to identify their preferences for particular music tracks. The present invention server product 38 then records those explicit preferences, discontinuing the use of inferred preferences for the particular tracks the user gave ratings for.

The present invention server software searches, using the serial numbers, for all the users who have rated the same music highly, and using Web information display techniques, identifies 39 and introduces 34 these users to one another, so that they may interact with each other.

The present invention server software at 40$a,b$ forms clusters of users with similar tastes using Automated Collaborative Filtering (ACF) technology furnished by NET-PERCEPTIONS, INC., and based on user preferences both inferred from user behavior and explicit. Automated Collaborative Filtering, in general, uses accumulated rating data furnished by a large number users to determine which users are likely to have similar tastes. For example, many different users might each rate a hundred or so movies from a collection of several thousand, specifying how much they like each movie on a scale of 1 (hate it) to 5 (love it). Once this ratings data is in place, such a typical ACF application would present each user with recommendations of other movies they might like, based on a comparison of that user's preferences with other users.

The present invention exploits this ACF technology in an innovative fashion by entering ratings into the system 40$a,b$ based on the behavioral detection of user preference 38. This sort of innovation is important because it ensures that larger numbers of ratings, and more accurate ratings, go into the ACF system 40$a,b$, which yields more accurate and interesting recommendations.

The present invention server software is capable of delivering messages—termed "Alerts" within a system employing the present invention—to end users. These messages are delivered to a user after the present invention server software records current user behavior. The choice of which users should see each message is based upon the users' individual behavior. The timing of message delivery is based upon the user's behavior in real time—that is, the message can be delivered precisely when the user chooses to listen to particular music.

A music identification subsystem of the present invention determines which piece of music is being played by a particular client. A piece of music is characterized by particular artist, title, and song. The present invention client program reports what's playing by passing in several different kinds of parameters. The client program gleans these parameters from the music player and/or the MP3 file tags. In some cases, these parameters may be complete, well-formed, and spelled correctly. In other cases the parameters may be misspelled or incomplete. In the worst case the player may report back nothing but a CD hash code or a MP3 file pathname.

The music identification subsystem takes the parameters, looks them up, and reports back the three identifying items: the artist, title and song being played. The identifiers point out the particular artist, title, or work uniquely within the set of known artists, titles, and works.

The music identification subsystem can be implemented in a way which allows several web server instances running on each of several machines to access it. It is acceptable to implement the system in a replicated fashion, with the same code running on each of several servers, or as a single server.

In one embodiment, the web servers are APACHE 1.3.12, with mod_php 4.0.0 built in. They run on LINUX (RED HAT 6.1/INTEL, kernel 2.2.12, glibc 2.1). The development environment is that provided with RED HAT 6.1. Additionally, an ORACLE 8i database version 8.1.5 is employed, running on SOLARIS 2.7/SPARC. The music ID subsystem could be implemented to run on LINUX servers, with a view towards porting it easily to run on SOLARIS.

Each piece of music is identified with three codes: the artist, title, and song being played. The first identifier is the title of the CD from which the music comes. The present invention uses a code (the domain DOT_TITLE in our data dictionary) to identify this title. Most of our DOT_TITLE unique identifiers are the same as MUZE Numbers (MUZENBR, see muze.com), although DOT_TITLE codes are assigned to titles which aren't cataloged by MUZE. Another identifier is the artist responsible for the CD. In the case of most popular music, the CD is identified by a single artist. The present invention uses a code (the domain DOT_ARTIST in our data dictionary) to uniquely identify an artist. Most of the values of this code relate directly to the PERFORMER2 column from MUZENBR. Again, the present invention can assign codes for artists which aren't cataloged by MUZE. The third identifier is the song (or track) for the music. The present invention uses a code (the domain DOT_TRACK in our data dictionary) to identify the individual track being played. This identifier is constructed by appending the disc number and track number to the appropriate DOT_TITLE code for the track. The DOT_TRACK uniquely identifies a song being played. In the MUZE database, each title has an associated genre and sub-genre.

The information sent from the player may be ambiguous in the way it identifies tracks. Our music identification system does its best to find a "canonical" track for each batch of track information sent from a client. For example, consider these three sets of track information:

Grateful Dead "Sugar Magnolia" American Beauty, 1969 4:10

Grateful Dead "Sugar Magnolia (Jam) Orpheum" bootleg, 1994, 34:20

Greatful Dead "Sugar Megnolia" American Beauty

The first of these is a track from a CD. The second is a recording made by a fan at a concert and put on an MP3 file. No record exists in the title database for this specific recording. In this case, the closest match for the second item in the data base may be the first item. The third item illustrates misspellings. In this case the closest match is also the first item.

The DOT_TRACK, DOT_TITLE, and DOT_ARTIST codes must remain permanently unchanging, as they will be used to record user activity and preferences throughout the system. The MUZENBRs from which the DOT_TITLE and DOT_TRACK codes are derived are permanently assigned. The present invention assigns the DOT_ARTIST code, and must make it a permanent assignment.

The music ID system, externally, offers three basic functions, and some extra service functions. The basic functions are these:

song =lookup_song (<input parameters>)
title =lookup_title (<input parameters>)
artist =lookup_artist (<input parameters>)

Because of the structure of the reference database used, the song's identity (the DOT_TRACK) also identifies the artist and title. However, for our purposes it makes sense sometimes to look up just the title or just the artist. In some situations, including misspellings in the input parameters, we may be able to search the database 120 in a way which would yield an ambiguous result if we were searching for the precise song, but an unambiguous result if we were searching just for the artist who created the song.

Each of these basic functions starts with the input parameters offered by the present invention client. Each function matches those parameters to the music database 120 and returns the single most likely choice of song, title, or artist. The music ID system also offers some simple service functions to navigate the artist/title/song hierarchy.

title=get_title_from_song (song)
artist=get_artist_from_song (song)
artist=get_artist_from_title (title)

Finally, the music ID system offers some simple service functions to retrieve genre information from the data base 120. Genre information, both general and specific, is provided for each title in our data base.

genre=get_genre(song)
genre=get_genre(title)

The basic music identification process flow must take into consideration many situations while attempting to identify MP3 files. It is acknowledged that the identification may not always be perfect. The following is a description of a music identification process flow for identifying MP3 files according to an embodiment of the present invention.

Transmit the contents of the MP3 file's ID3 tag to the server, if an ID3 tag is available and populated with information. Most MP3 files have at least some information in the ID3 tag. This information is put there by the "ripper"—the program which created the MP3 file from the CD. In many cases the ripper fetched that information from the CDDB version 1 data base. In other cases the user of the ripper keyed in the information. ID3 tags are often lost or incomplete (e.g., NAPSTER often truncates files, and the ID3 tags are at the ends of the files).

Transmit each MP3 file's path and file name. These are often named after the track, CD, and artist.

Match the incoming textual data to the MUZE track list data base using the multi-step search algorithm. This algorithm is fairly accurate at identifying the appropriate artist—a very important key to the operation of the system. It is also accurate at identifying the CD and track, but less so.

Display the appropriate information from the MUZE database (and elsewhere) when the artist and CD are known.

The basic music identification process flow must take into consideration many situations while attempting to identify CDs. It is acknowledged that the identification may not always be perfect. The following is a description of a music identification process flow for identifying CDs files according to an embodiment of the present invention. Identifying CDs.

Compute two TOC hash codes including the MICROSOFT hash code and the open-source "XCMD" hash-code (the one used by CDDB version 1) from the CD's TOC. The present invention uses proprietary technology allowing it to do this without interfering with the CD player operation.

Retrieving information from CDDB version 1 based on the hash codes. This is an optional step, that may be substituted with other retrievals.

Transmit textual descriptive information if available within the player describing the track (similar to the above). This information may exist within the MICROSOFT—furnished CDPLAYER.INI file, or may be within some kind of play list within the player. This textual information can come either indirectly from CDDB, or can come from users indexing their own CD products.

Augment the track-list data base we propose to purchase from MUZE with a collection of freely-available TOC data on the internet. The TOC data we have assembled to date includes over 45,000 unique TOC hash codes. The quality of this freely available track list data may vary, but the cross-correlation between MICROSOFT CD player hash codes and Artist/Title/Track data is sufficient.

Insure that the top 100 CDs are indexed correctly with the MICROSOFT hash code in our data base, by doing so manually.

Match the data coming in from the user with the MUZE tracklist using purely textual techniques, if possible.

If there is a good match and there is an incoming TOC hash code there is no hash code in our data base, we put the incoming hash code into our data base, associating it with the Title identifier (derived from the MUZENBR).

If there is a good match and the hash code is different from what is stored in the database, we make an assumption of multiple TOC hash codes, and record an alternate hash code.

If the incoming data contains a hash code, but no useable textual data, it is looked up. If it matches something on file, the present invention matches the title being played. If it isn't on file, no match to that music is made. It is also possible for a hash code to match more than one title.

Display appropriate information from the MUZE database (and elsewhere) when the artist and CD are known.

CD identification involves various methods. One is the sample data kit from MUZE.COM. Additionally, freely available CD tracklists from around the web (e.g., hizen.de/cdplayer/index.html). MUZE offers a unique MUZE number (MUZENBR) for each unique published CD. CDs which haven't been published (such as those created by independent artists and personal compilations written onto CD-R media) don't have MUZENBRs. Tracklists offer a MICROSOFT-define hash-code. Any particular published CD will have a single MUZENBR and possibly multiple different hash codes.

CDDB (originally the open-source XCMD project) uses a different hash code. These hash codes are derived from the table of contents of the CD. The CD table of contents consists of information describing the number of music tracks on the CD, the overall length of the music on the CD, and the length of each track (see www.disctronics.co.uk for further information). The impact of this method of computing hash codes is that two short CDs—CDs with a small number of tracks on them—are statistically much more likely to have identical tables of contents and therefore identical hash code values than longer CDs. CDs of any length can have this problem of TOC hash-code collision. Usually this TOC hash-code collision isn't due to imperfections in the hash function, but rather identity in the underlying TOCs.

The present invention provides performance benefits, including lookup performance. Assuming that a typical song is three minutes in length, for each 1000 users online, the music ID system will have to handle approximately 5.6 queries a second. Assuming 500,000 users, of which about 15% (75,000) will be active, this will require, if the active members are all listening at the same time, about 500 lookups per second (2 ms of processing per lookup). The system is designed for 1000 lookups per second, to give room for growth. Notice that the music lookup subsystem works from basically static reference data. This means it's possible to provide several parallel servers to perform this task.

MUZE provides updated data weekly, and the present invention may add data from other sources. It must be possible to load the updated data into our operational lookup system in a convenient amount of processing wall-clock time (an hour or less), in a way which interrupts the lookup process for no more than a second or two.

These lookup algorithms assume that the taking of input data items and the mapping of each of them to a single particular track, title, and artist from within our predetermined set of tracks, titles, and artists. These algorithms have two closely related phases. The first phase is obtaining and preprocessing reference data (the MUZE tracklist, augmented with data from other sources) to build reference index tables. This phase can be performed in batch each time the reference data is updated. The second phase is taking information from clients and matching it to the reference database, then ordering the match results by relevance. The heart of such lookup algorithms lies in the structure of the reference tables, and their representation of the reference data set. Incoming reference data has these fields (table and column from MUZE data)

| Table and column | Spelling | Description |
| --- | --- | --- |
| ZTITLE.MUZENBR | | Title identification number (DOT_TITLE) |
| ZTITLE.PERFORMER | Authoritative | Artist name, suitable for display |
| ZTITLE.PERFORMER2 | Authoritative | Artist name (indexed to DOT_ARTIST) |
| ZTITLE.TITLE | Authoritative | Title name |
| ZTITLE.CAT3 | Authoritative | Major Genre |
| ZTITLE.CAT4 | Authoritative | Sub Genre |
| ZSONG.MUZENBR | | DOT_TITLE (join index to ZTITLE table) |
| ZSONG.DISC | | Which disc in a multiple disc set |
| ZSONG.TRK | | Which track on the disc |
| ZSONG.SONG | Authoritative | Song title |

The present invention provides information for CDs we add to the MUZE database in a form similar to this, with a separate distinguishable set of MUZE numbers. The present invention also has incoming reference data from CDPLAYER.INI files we gather from around the net, and from the machines used, with MUSICMATCH JUKEBOX, to index new CDs.

hashcode MICROSOFT Hash code for CD

| | | |
| --- | --- | --- |
| hashcode | | MICROSOFT Hash code for CD |
| artist | Questionable | Artist |
| genre | Accurate | Genre |
| title | Questionable | Title name |
| song | Questionable | One entry for each song. |

The first phase of the search takes this input data and builds reference tables. In one embodiment the form for the reference tables is:

String table:
  Key: Each distinct authoritative text string (title, song, artist), case folded to lower case, with frequently repeated words (a, the) and all punctuation removed.
  Value: a list of (DOT_ARTIST, DOT_TITLE, DOT_TRACK) triples, one entry for each item the key appears in.

Word-triple table:
  Key: Each set of consecutive three words from the string table.
  Value: a list of (DOT_ARTIST, DOT_TITLE, DOT_TRACK) triples, one entry for each item the key appears in.

Word table:
  Key: Each individual word from the string table.
  Value: a list of (DOT_ARTIST, DOT_TITLE, DOT_TRACK) triples, one entry for each item the key appears in.

Metaphone-triple table:
  Key: Metaphone keys for each set of consecutive three words from the string table.
  Value: a list of (DOT_ARTIST, DOT_TITLE, DOT_TRACK) triples, one entry for each item the key appears in.

Metaphone word table:
  Key: Metaphone keys for individual word from the string table.

Value: a list of (DOT_ARTIST, DOT_TITLE, DOT_TRACK) triples, one entry for each item the key appears in.

Phase 2 of the lookup algorithm works as follows. In Step 1, for each text string in the input data, look for matches in the string table. Retrieve the list of DOT_ARTIST, DOT_TITLE, DOT_TRACK triples, and assign each item in the retrieved list a relatively high weight. The weight should be a constant times the number of words matched in the string. Step 2, for each triplet of words in each distinct string in the input data, look for matches in the string table. Again, retrieve the list of DOT_ARTIST, DOT_TITLE, DOT_TRACK triples, and assign each item in the retrieved list a lower weight. Step 3, for each word, look for matches in the word table. Assign a modest weight to each word. Step 4, for each triplet of words (as in step 2), compute the metaphone keys and match to the metaphone-triple table. Assign a small weight to each matched item. Step 5, for each individual word, compute the metaphone key and match it to the metaphone word table. Assign a very small weight to each matched item. Step 6, order the matched items by total weight matched. If looking for artist, order the artists. If looking for title, order the titles, and if you're looking for track, order the tracks. The highest weight wins. Note that it's very important to do the ordering depending on what you're looking for. Step 7, (optional) if two or more different items have a tie for top weight, get help from the user in disambiguating the results.

When constructing word triples, we include placeholders at the beginning and end of phrases (indicated by zzz in this specification).

"Love in an elevator" turns into:
zzz love in
love in an
in an elevator
an elevator zzz
"Aerosmith" turns into:
zzz aerosmith zzz
"The Boston Symphony Orchestra" turns into, after stripping the common word:
zzz boston symphony
boston symphony orchestra
symphony orchestra zzz The following is an example CDPLAYER.INI entry:
[1081d72]
EntryType=1
artist=Jimmie's Chicken Shack
title=Bring Your Own Stereo
genre=sock
numtracks=13
0=Spiraling
1=Lazy Boy Dash
2=Do Right
3=String Of Pearls
4=Ooh
5=Let's Get Flat
6=Trash
7=Fill In The Blank
8=Face It
9=Silence Again
10=Pure
11=Waiting
12=30 Days While this invention has been particularly shown and described with references to preferred embodiments thereof, it will be understood by those skilled in the art that various changes in form and details may be made therein without departing from the scope of the invention encompassed by the appended claims. For example a "piece of music" is meant to encompass any recorded media, including audio, video and multimedia (e.g., a single, or multi-media recording on CD, a video recording on DVD, etc.).

What is claimed is:

1. A method of collecting user preference information related to a playing media recording, comprising the steps of:
   gathering descriptive information related to the playing media recording from a media player program presenting the playing media recording;
   determining if tags are embedded in the playing media recording and gathering information related to the playing media recording from the tags embedded in the playing media recording, if the tags exist;
   determining if table of contents information for a collection of tracks containing the playing media recording exists, where each track in the collection has a respective length, and gathering the table of contents information for the collection by identifying the collection using an identifier computed from concatenating the track lengths, if the table of contents exists;
   assembling the gathered descriptive information, from the tags and the table of contents information into an media recording information packet; and
   sending the media recording information packet to a server computer, resulting in a collection of user preference information related to the playing media recording.

2. The method of claim 1 wherein the descriptive information comprises:
   a user identifier; and
   at least one of: a name of the playing media recording, a name of a collection containing the playing media recording, a name of an artist performing the playing media recording; and
   a sequence number of the playing media recording within the collection.

3. The method of claim 1 wherein the tags are MPEG Layer 3 tags.

4. The method of claim 1 further comprising:
   responding to said sending the media recording information packet to the server by:
   identifying the playing media recording with a best matching identifier, the best matching identifier being based on the media recording information packet sent;
   inferring user's preferences relating to the playing media recording by tracking the best matching identifier identifying the playing media recording; and
   storing the best matching identifier and inferred user preferences in the collection of user preferences, where the collection of user preferences is stored in a database consisting of information related to audio files.

5. The method of claim 4, wherein identifying the playing media recording with a best matching identifier further includes:
   using the identifier computed from concatenating the track lengths to identify a matching table of contents hash code stored in the database; and
   if no matching table of contents hash code exists in the database, then adding the identifier computed from concatenating the track lengths to the database.

6. The method of claim 5, wherein if a matching table of contents hash code exists in the database, then correlating, in the database, the playing media recording with artist, title and track data associated with the table of contents hash code.

7. The method of claim 4, wherein the step of inferring user's preferences further includes tracking a user's repeated behavior by tracking the best matching identifier identifying the playing media recording.

8. The method of claim 1, wherein the step of sending the media recording information packet further includes creating a user community using information from the collection of user preferences to generate a list of users having similar preferences.

9. The method of claim 1 further comprising responding to sending the media recording information packet to the server by soliciting the user's preference relating to the media recording.

10. The method of claim 1 wherein the step of gathering information related to the playing media recording further includes identifying the embedded tags at an end of a media file, where the media file is the playing media recording.

* * * * *